Sept. 25, 1956  R. B. SMITH  2,764,645
LIQUID LEVEL CONTROL
Filed Oct. 18, 1952

INVENTOR
Roy B. Smith

BY *[signature]*

ATTORNEY

United States Patent Office 2,764,645
Patented Sept. 25, 1956

2,764,645
LIQUID LEVEL CONTROL

Roy B. Smith, Washington Court House, Ohio, assignor to Air Industries Company, Inc., Columbus, Ohio, a corporation of Ohio Application October 18, 1952, Serial No. 315,451

4 Claims. (Cl. 200—82)

This invention relates to fluid-responsive switch devices of the type adapted for use in controlling the opening and closing of electrical circuits. The invention has particular reference to switch devices for use in association with containers holding variable quantities of liquid, whereby through the construction and operation of such devices the quantity of liquid contained in an associated container may be readily ascertained or controlled from positions relatively remote to the container or containers with which the devices are connected.

In accordance with the present invention, a switch device of this kind is provided. The device comprises a fluid-receiving cylinder including an internal chamber in which is formed in the bottom thereof and intermediately of its length a liquid-admitting port; means are provided whereby liquid enters the chamber through said port, the liquid flowing from an associated liquid container or reservoir adjacent to which the cylinder is positioned. Also, in accordance with the present invention, the cylinder on its upper side, diametrically opposite the liquid inlet port, is provided with a communicating overflow or liquid-discharging port leading to the associated container or to the atmosphere. A piston is slidably mounted in the chamber and disposed normally between said ports and the rear end of the cylinder, means being provided for admitting a gaseous fluid under pressure into the rear end of the cylinder to cause forward movement of the piston therein against the pressure of a body of liquid or other fluid contained in the forward portion of the chamber. The arrangement of these parts of the control switch is such that when the liquid level in the associated container or reservoir occupies a predetermined plane, the liquid-receiving portion of the cylinder chamber will be filled with the liquid. Under these conditions, forward movement of the piston in response to gaseous fluid pressure applied to one side of the piston will be substantially prevented for the reason that the liquid in the chamber cannot be displaced. However, if the liquid level in the associated container or reservoir falls below such predetermined level, allowing the presence of air, or other compressible fluid in the cylinder chamber, greater stroke movement than normal will be allowed the piston in response to an actuating pressure applied to one side thereof by the gaseous fluid. If the stroke is of an increased character, a stem, provided on and movable with the piston and projecting exteriorly of the cylinder, will be actuated to operate a contact circuit-making and breaking mechanism of the switch, causing the opening or closing of an associated electrical circuit in which is incorporated a signalling device, or any other electrically actuated instrumentality, the energized signal serving to notify an observer of the liquid level condition in the container or reservoir, or the closed circuit may may operate a motor-driven pump, or the like, by which the liquid level may be restored in the container or reservoir to a given volume.

It is an object of the invention to provide a fluid-controlled switch of the character set forth by which a reliable and accurate means is provided for enabling an operator, other observer, to determine liquid volumes present in a confined and relatively remotely positioned structure.

It is another object of the invention to provide a regulatory switch device which is responsive directly to the volume of liquid present in associated receptacles or containers, whereby to provide reliable and positive means for definitely ascertaining such liquid volumes through the automatic opening and closing of an electrical circuit associated with the device.

It is a further object of the invention to provide an improved switch device which constitutes an improvement upon control apparatus of this character heretofore provided in the art.

Other objects will appear from a perusal of the following description, wherein is defined a practical single, preferred, embodiment of the invention, and which has been illustrated in the accompanying drawings, wherein.

Figure 1:
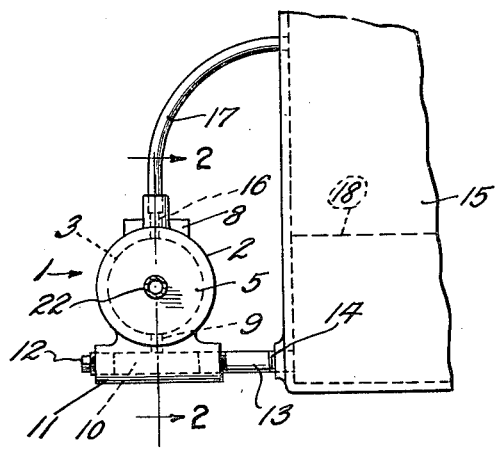
Fig. 1 is a view in front elevation disclosing a portion of a liquid container or receiver and the associated liquid level control switch of the present invention.

Referring more particularly to the drawings, the numeral 1 designates the improved liquid level responsive switch of the present invention. As shown, the switch comprises a cylinder 2 which is bored internally to provide a longitudinally extending piston chamber 3. This chamber at the rear end thereof is threaded, as at 4, for the reception of a closure plug 5. Likewise, the opposite or forward end of the chamber is threaded as at 6 for the removable reception of a plug 7, the latter carrying the base 8 of a circuit-governing switch mechanism S.

Formed in the bottom of the cylinder, intermediately of the length thereof, and communicating with the chamber 3, is a liquid-admitting port 9. This port at its lower end communicates with a longitudinally extending passage 10 provided in a transversely extending web 11, which depends from and constitutes an integral part of the cylinder 2. Forwardly the passage 10 is closed by a plug 12, while the opposite end thereof is threaded to receive one end of a pipe section 13. The opposite end of this pipe section is threaded as at 14 into the lower end of a liquid container or reservoir 15.

Provided in the upper part of the cylinder 2, diametrically opposite to and in registry with the liquid-admitting port 9, is a liquid return or venting port 16. By a pipe member, shown at 17, the port 16 communicates with the interior of the container or reservoir 15 above the level 18 of liquid in said container or reservoir.

Figure 2:
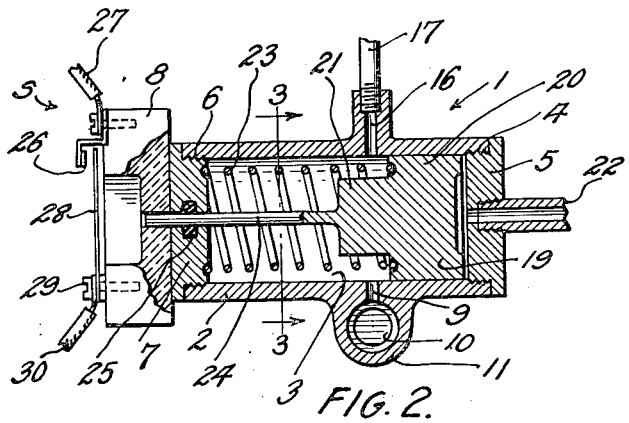
Fig. 2 is a vertical longitudinal sectional view taken through the control means on the plane indicated by the line 2—2 of Fig. 1.
Figure 3:
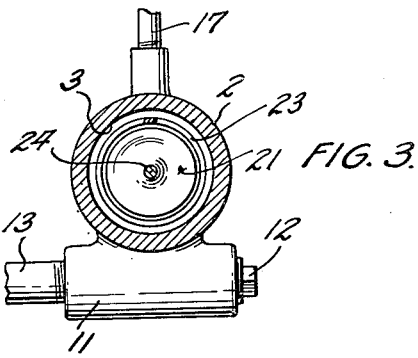
Fig. 3 is a transverse sectional view on the line 3—3 of Fig. 2, looking in the direction indicated by the arrow.

Slidably positioned in the chamber 3, and disposed normally between the ports 9 and 16 and the plug 5 thereof, is a piston 19. As shown, the piston includes an enlarged body portion 20 having close-fitting sliding engagement with the wall surfaces of the chamber 3, the piston terminating forwardly in a diametrically reduced boss 21. A gaseous fluid under pressure, by a manually operated valve control, is adapted to be intermittently admitted into the piston-actuating end of the cylinder by way of a pipe line indicated at 22. Through the admission of such gaseous fluid under pressure, the piston is adapted to be forced forwardly against resistance offered by the presence of liquid in the chamber 3. A light weight return spring 23 is employed to maintain the piston normally in the operating position thereof depicted in Fig. 2.

The piston includes a forwardly projecting longitudinally and axially disposed stem 24. At its forward end this stem is received in an axial opening formed in the plug 7 and in the base 8 of the switch mechanism. In this instance, the plug 7 is provided with a packing 25 which surrounds the stem 24 and prevents undesired fluid escape through the openings provided for the sliding reception of stem 24. Arranged on the switch base 8 is a contact 26 which is electrically joined with a conductor 27. Engaging with the contact 27 is the free end of a movable switch-operating member, shown in this instance as comprising a reed 28, the opposite or captive end of the reed being held by a terminal screw 29 to which is connected one end of a conductor 30, the latter being employed in conjunction with the conductor 27 to form an electrical circuit.

In this circuit there may be positioned any suitable type of an electrically actuated appliance. For example, this appliance may comprise an audible or visual signalling device, not shown, located relatively remotely, if desired, to the container 15, or the circuit may include windings of an electric motor employed in the driving of a pump or the like by means of which liquid may be supplied automatically to the container 15, as will be readily understood. My control switch is applicable to all such operations.

In the operation of the device, it will be seen that when a normal quantity of liquid is present in the container 15, such as is indicated by the level 18 in Fig. 1, the position of the switch 1 will be such, in its relation to the container, that the same liquid level will be established in the cylinder. Therefore, when air under pressure, or the like, is admitted into the closed end of the cylinder 2, through the line 22, there will be but limited longitudinal movement on the part of the piston 20, since any such movement will be severely restricted or prevented by the resistance exerted on the piston by the body of confined liquid contained within the chamber 3 once the piston has advanced sufficiently to close the ports 9 and 16.

Thus, the outer end of the stem 24, which is joined with the piston, will not be able to move longitudinally a sufficient distance to make an electrical circuit through contact with the reed 28. However, when the liquid level 18 recedes in the container 15 to a point wherein the chamber 3 is devoid of liquid, or is only partially filled with liquid, then, due to the presence of air in the cylinder as the result of the lowered liquid level therein, variable longitudinal stroke movement may be imparted to the piston 20 when air is admitted into the cylinder through line 22. Extended longitudinal movement will enable the stem 24 of the piston to contact the reed 28, thereby opening or closing, as desired, an associated electrical circuit to operate a suitable signal, or to energize or deenergize, as the case may be, a motor or other appliance present in the circuit.

In view of the foregoing it will be seen that the present invention provides a liquid level responsive mechanism which is characterized by its simplicity of construction, ease of operation and functional reliability. While I have described a preferred embodiment thereof, it will be obvious to those skilled in the art that various changes may be made without departing from the spirit and scope of the invention, as defined by the following claims.

I claim:

1. A liquid level responsive switch, comprising: a casing provided with an internal chamber, the walls of said chamber intermediately of the length of the latter being formed with oppositely disposed vertically registering liquid-admitting and venting ports; a piston slidably mounted in said chamber; means normally maintaining said piston at one end of said chamber and in a position in which said ports are uncovered by the piston and disposed in open communication with said chamber; pneumatic pressure means for applying a force to said piston to move the same axially of said chamber toward the end thereof opposite that in which said piston is normally positioned and to an extent at least closing said ports, and thereby to cause said piston to exert compression forces upon fluids present in said chamber between said ports and the said opposite end of said chamber; a switch carried by and positioned exteriorly of said casing and including a movable circuit-controlling member; and an actuating rod carried by and movable with said piston and extending exteriorly of said chamber from said opposite end thereof, said actuating rod being engageable with the circuit-controlling member of said switch upon predetermined axial movement of said piston in said chamber to move said circuit-controlling member and thereby actuate said switch.

2. In a liquid level-responsive switch mechanism; a horizontally arranged cylindrical body having an internal, substantially closed, piston-receiving chamber and formed with a liquid inlet communicating with said chamber at its lowermost region intermediate the ends thereof and a vent communicating with said chamber at its uppermost region intermediate the ends thereof and opposite said liquid inlet; a fluid-pressure-responsive piston slidably carried in said chamber for movement axially thereof; port means provided in one end of said body and communicating with one end of said chamber for admitting a fluid under pressure to said chamber to act on one side of said piston; spring means positioned in the chamber of said body and engaging the opposite side of said piston to normally position the latter in the end of said chamber adjacent said port means, said piston being movable axially of said chamber from the end thereof adjacent said port means toward the opposite end thereof in response to the admission of pressure fluid through said port means, and being arranged to interrupt communication between said chamber and said liquid inlet and vent during such movement and thereby impart compressive forces to fluids contained in said chamber between said opposite end thereof and said inlet and said vent; a switch carried by said body exteriorly thereof and at the end thereof opposite said port means and including an element movable to open and close said switch; and switch-actuating means carried by and movable with said piston and projecting outwardly from the said opposite end of the chamber of said body, said switch-actuating means being engageable with the movable element of said switch to move the latter in response to a predetermined axial movement of said piston in the chamber of said body, the extent of movement of said piston in response to a given pressure admitted through said port means being determined by the level of liquid in the chamber of said body between the said opposite end thereof and said inlet and vent.

3. A liquid level-responsive switch device comprising a casing formed with an internal, substantially horizontally disposed, cylindrical chamber; a piston carried in said chamber for movement longitudinally thereof; spring means engaging said piston and urging the latter to a first position adjacent one end of said chamber; compressed air inlet means communicating with said chamber at said one end thereof, said chamber being closed at the opposite end thereof; a liquid inlet port formed in said casing and communicating with said chamber intermediate its ends and at substantially the lowermost level thereof; atmospheric venting means formed in said casing and communicating with said chamber substantially at the uppermost level thereof and disposed opposite to said liquid inlet port, said piston being movable longitudinally in said chamber in response to the introduction of compressed air within said compressed air inlet means to close said liquid inlet port and said venting means and to exert pressure upon fluids disposed in said chamber between the closed end thereof and said liquid inlet port and venting means; a switch carried by said casing and including a movable circuit-controlling member; and means carried by said piston and engageable with the circuit-controlling member of said switch upon a given longitudinal movement of said piston toward the closed end of said chamber, the extent of longitudinal movement of said piston toward the closed end of said chamber in response to a given pressure within said compressed air inlet means being determined by the level of noncompressible liquid contained in said chamber in advance of said liquid inlet port and said venting means.

4. In combination; a reservoir adapted to receive and contain a given level of liquid therein; a generally horizontally arranged cylinder disposed exteriorly of said reservoir and having a liquid-receiving port disposed intermediately of its ends at the lower level thereof and communicating with said reservoir to receive liquid therefrom, said cylinder having an upper level arranged in a common horizontal plane with a desired level of liquid within said reservoir and being formed with an atmospheric vent at its upper level disposed diametrically opposite said liquid-receiving port; a piston slidably carried in said cylinder; spring means biasing said piston toward one end of said cylinder, said cylinder being closed at its opposite end; means for moving said piston longitudinally of said cylinder toward the closed end thereof and in opposition to said spring means, said piston being movable in response to said last-named means to first close said liquid-receiving port and said vent and being operable upon further movement to exert pressure upon fluids contained in said cylinder between the closed end thereof and said vent and port; an electrical switch including a movable circuit-controlling member; and means carried by said piston and operable in response to a given longitudinal movement of said piston within said cylinder to engage the circuit-controlling member of said switch and to move the latter.

References Cited in the file of this patent

UNITED STATES PATENTS

| | | |
|---|---|---|
| 1,479,792 | Delvin et al. | Jan. 8, 1924 |
| 1,602,467 | Sword | Oct. 12, 1926 |
| 1,807,280 | Carpenter | May 26, 1931 |
| 1,856,584 | Parkhill | May 3, 1932 |
| 2,017,966 | Hardison | Oct. 22, 1935 |
| 2,529,688 | Grupp | Nov. 14, 1950 |